United States Patent [19]
Szolis

[11] Patent Number: 5,572,824
[45] Date of Patent: Nov. 12, 1996

[54] WILDLIFE DECOY

[76] Inventor: John N. Szolis, 640 Pearce Mill Rd., Wexford, Pa. 15090

[21] Appl. No.: 528,354

[22] Filed: Sep. 14, 1995

[51] Int. Cl.⁶ .................................................. A01M 31/06
[52] U.S. Cl. ........................................................................ 43/3
[58] Field of Search ............................. 43/2, 3; 446/370, 446/373, 374

[56] References Cited

U.S. PATENT DOCUMENTS

| | | | |
|---|---|---|---|
| 430,565 | 6/1890 | Curlin | 43/3 |
| 1,306,655 | 6/1919 | Bocho | 43/3 |
| 2,339,983 | 1/1944 | Doy | 43/3 |
| 2,439,167 | 4/1948 | Jackson | 43/3 |
| 2,564,890 | 8/1951 | Fox | 43/3 |
| 2,706,357 | 4/1955 | Nigl | 43/3 |
| 2,755,588 | 7/1956 | Johnson | 43/3 |
| 2,812,608 | 11/1957 | Jones | 43/3 |
| 2,814,898 | 12/1957 | Fluke | 43/3 |
| 3,055,134 | 9/1962 | Aicher | 43/3 |
| 3,470,645 | 10/1969 | Mattson | 43/3 |
| 5,207,757 | 5/1993 | Franceschini | 43/3 |

Primary Examiner—Kurt Rowan
Assistant Examiner—James Miner
Attorney, Agent, or Firm—Webb Ziesenheim Bruening Logsdon Orkin & Hanson, P.C.

[57] ABSTRACT

The present invention discloses a wildlife decoy form and associated decoy. The wildlife decoy form includes a head section and a tail section with at least one longitudinal support coupled to the head and tail sections extending along a longitudinal, peripheral portion of the decoy form. A plurality of circumferential ribs is attached to the longitudinal supports at spaced locations thereon with each circumferential rib extending along a peripheral portion of the decoy. To form the decoy, a skin is attached to the decoy form and overlays at least a portion of each of the supports and ribs of the decoy form.

19 Claims, 7 Drawing Sheets

WILDLIFE DECOY

BACKGROUND OF THE INVENTION

1. Field of the Invention

The present invention relates to wildlife decoys. More specifically, the present invention relates to a waterfowl decoy form and an associated waterfowl decoy.

2. Prior Art

Waterfowl decoys are simulated birds constructed from various materials. The decoys are used by hunters by floating one or more decoys in a body of water in hopes of luring game, such as ducks, within shooting range.

Canvas body decoys represent one class of waterfowl decoys. The traditional method of producing a canvas body decoy is to cut a baseboard to the top profile, i.e., the plan view or bird's-eye view, of the desired bird. The bird's head is carved generally in an upright or alert position and then attached to the profile baseboard. Wire frames are bent in a U-shape depicting the body of the bird above the waterline. The wire U-shaped frame members are generally positioned on the baseboard at approximately 2-inch centers. The wire frame is covered with canvas, and the resulting decoy is painted accordingly. This traditional method of producing canvas body decoys results in a decoy that may not closely depict the profile of the subject species. Additionally, the decoy generally does not adequately depict the floating characteristics of the desired bird. The prior art decoy designs cannot provide completely realistic representations of the particular species regarding both the appearance and the flotation of the subject birds.

It is an object of the present invention to provide a wildlife, waterfowl decoy that presents a more realistic representation of a particular species regarding both appearance and flotation characteristics. It is another object of the present invention to provide better control over the flotation attitude of the decoy and provide a broader range of poses in which the resulting decoy may be formed. It is another object of the present invention to improve the structural stability and durability of the decoy and to improve the overall performance of the resulting decoy.

SUMMARY OF THE INVENTION

The objects of the present invention are achieved by providing a wildlife decoy form that includes a head section, a tail section and at least one longitudinal support coupled to the head section and tail section extending along a longitudinal, peripheral portion of the decoy form. A plurality of circumferential ribs is attached to each said longitudinal support at spaced locations thereon wherein each circumferential rib extends along a peripheral portion of the decoy form.

In one embodiment of the present invention, the wildlife decoy form is incorporated in a waterfowl buoyant decoy. The decoy form may include a head section and a tail section. An upper longitudinal support may be attached to the head section and tail section extending along an upper longitudinal, peripheral portion of the decoy in a center plane of the decoy with a lower longitudinal support coupled to the head section and tail section extending along a lower longitudinal, peripheral portion of the decoy in the longitudinal center plane. A plurality of circumferential ribs may be attached to and extends between the upper and lower longitudinal supports at spaced locations thereon with each rib extending along a peripheral portion of the decoy and wherein the ribs and the upper and lower longitudinal supports define a hollow interior. The buoyant waterfowl decoy may include a waterproof canvas skin attached to the decoy form overlaying the ribs and the longitudinal supports substantially surrounding the hollow interior.

The present invention may further include a ballast weight provided within the hollow interior positioned, as needed, to counterbalance other aspects of the decoy and appropriately modify the floating characteristics of the decoy. The decoy of the present invention may further include a buoyancy-assisting mechanism, such as Styrofoam® material or the like, positioned within the hollow interior to help conform the decoy to the floating characteristics of the subject species. The decoy of the present invention may further include one or more grommets positioned within the skin for selectively flooding the hollow interior of the decoy to help conform the floating characteristics of the decoy to the subject species. The hollow interior of the decoy may be compartmentalized to contain any selective flooding, thereby providing greater degree in flexibility of design.

These and other objects of the present invention will be clarified in the description of the preferred embodiment taken with the attached figures, wherein like reference numerals represent like characters throughout.

DESCRIPTION OF THE PREFERRED EMBODIMENT

Figure 1:
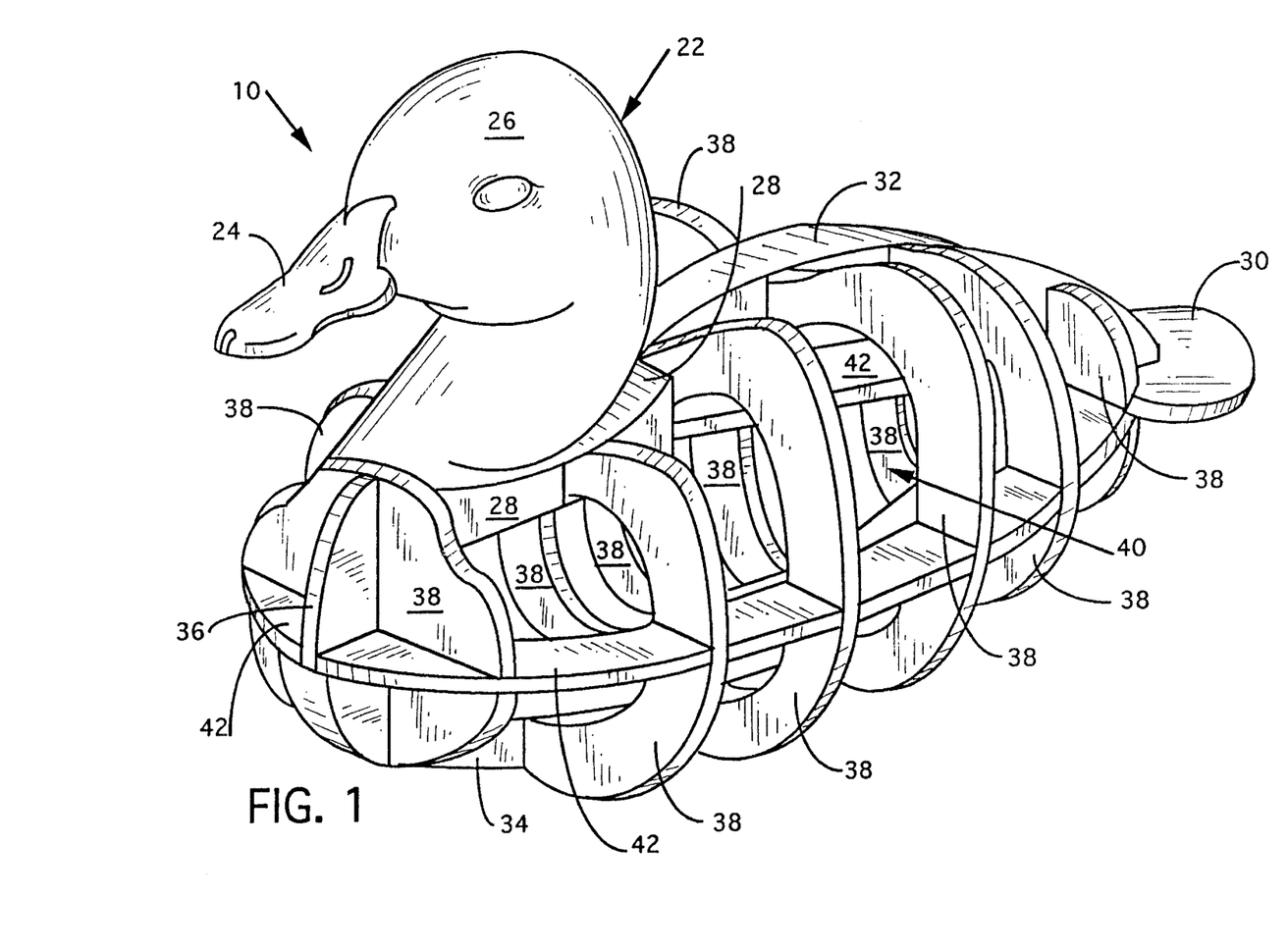
FIG. 1 is a perspective view of a wildlife, waterfowl decoy form according to the present invention.
Figure 2:
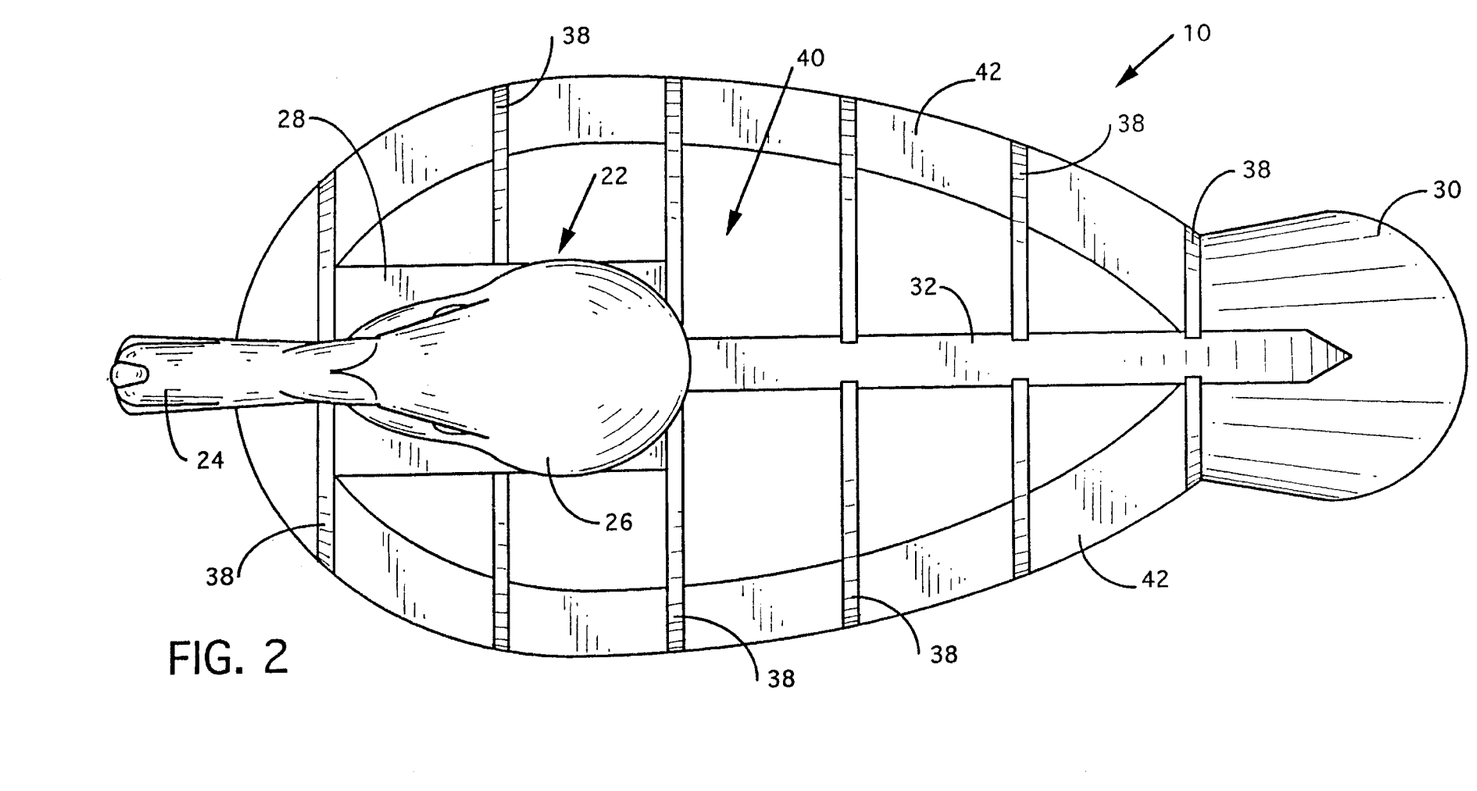
FIG. 2 is a top view of the decoy form illustrated in FIG. 1.
Figure 3:
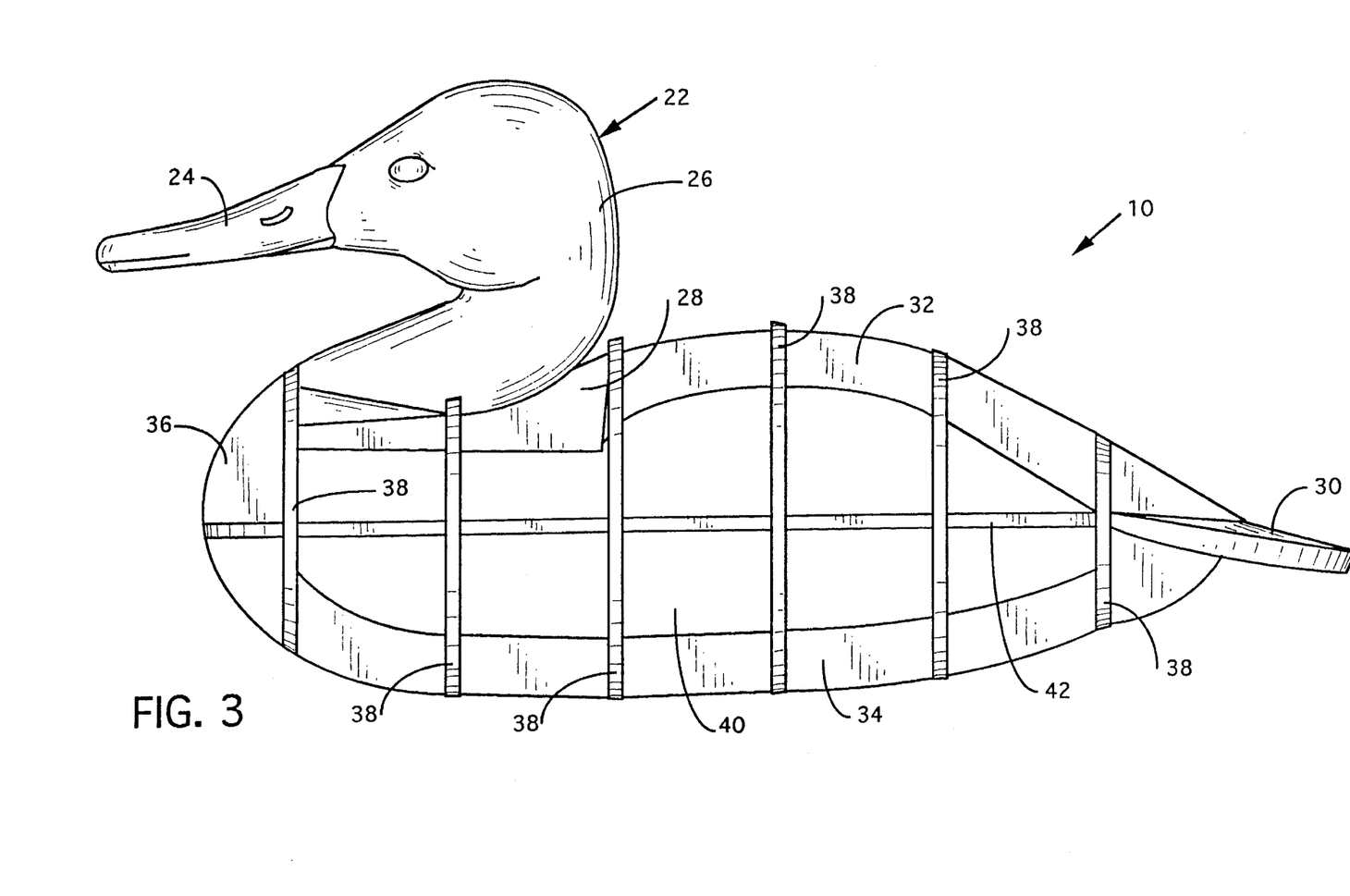
FIG. 3 is a side view of the decoy form illustrated in FIG. 1.

A waterfowl decoy form 10, according to the present invention, is illustrated in FIGS. 1–3. The waterfowl decoy form 10 can be used to form a canvas body decoy 20 illustrated in FIGS. 4–6 as will be described hereinafter.

The waterfowl decoy form 10 includes a wooden head section 22 formed integrally of bill 24 and head 26 on solid mounting base 28. The head section 22 may be formed of other suitable materials such as plastics or the like. The head section 22 may be carved, molded or shaped in an appropriate fashion. The decoy form 10 of the present invention allows the head section 22 to be formed with the head 26 and bill 24 in any orientation, including those off-center from the longitudinal center plane of the decoy 20.

The decoy form 10 includes a wooden tail section 30. The wooden tail section 30 may be formed of other suitable materials. The exterior portions of the tail section 30 and head section 22 can be appropriately painted to conform to the desired species.

A wooden upper longitudinal support 32 is attached to the head section 22 at base 28 and to the tail section 30. The upper longitudinal support 32 extends along an upper longitudinal, peripheral portion of the decoy 20 along the vertical, longitudinal center plane of the decoy 20 as best illustrated in FIGS. 2 and 3. A wooden lower longitudinal support 34 is attached to the head section 22 through a front strut 36 and a front-most circumferential rib 38. The lower longitudinal support 34 is attached to tail section 30. The lower longitudinal support 34 extends along a lower longitudinal, peripheral portion of the decoy 20 along the vertical, longitudinal center plane of the decoy 20. The lower longitudinal support 34 and upper longitudinal support 32 are combined to form the profile of the subject species along the vertical, longitudinal center plane of the decoy 20 as best illustrated in FIG. 3.

A plurality of wooden circumferential ribs 38 is attached to and extends between the upper longitudinal support 32 and lower longitudinal support 34 at spaced locations thereon. Each wooden rib 38 extends along a peripheral portion of the decoy 20 in a plane substantially perpendicular to the upper and lower longitudinal supports 32 and 34.

Each rib 38 forms a profile of the subject species, both above and below the waterline, in a plane perpendicular to the vertical, longitudinal center plane of the decoy 20. The ribs 38 and supports 32 and 34 define a hollow interior 40 of the decoy 20.

Horizontal wooden side supports 42 extend from a front-most portion of the decoy form 10 and are attached to the lower longitudinal support 34. The side supports 42 extend to the tail section 30 along a peripheral portion of the decoy form 10. The pair of horizontal side supports 42 are attached to each rib 38 and combine to form the plan profile, or bird's-eye profile, of the decoy 20. The side supports 42 additionally surround the hollow interior 40. The supports 32, 34 and 42 and ribs 38, like head section 22 and tail section 30, may be made of other suitable materials formed in an appropriate manner. For example, molding these elements from plastic may provide a cost-effective method for forming the decoy form 10.

Figure 4:
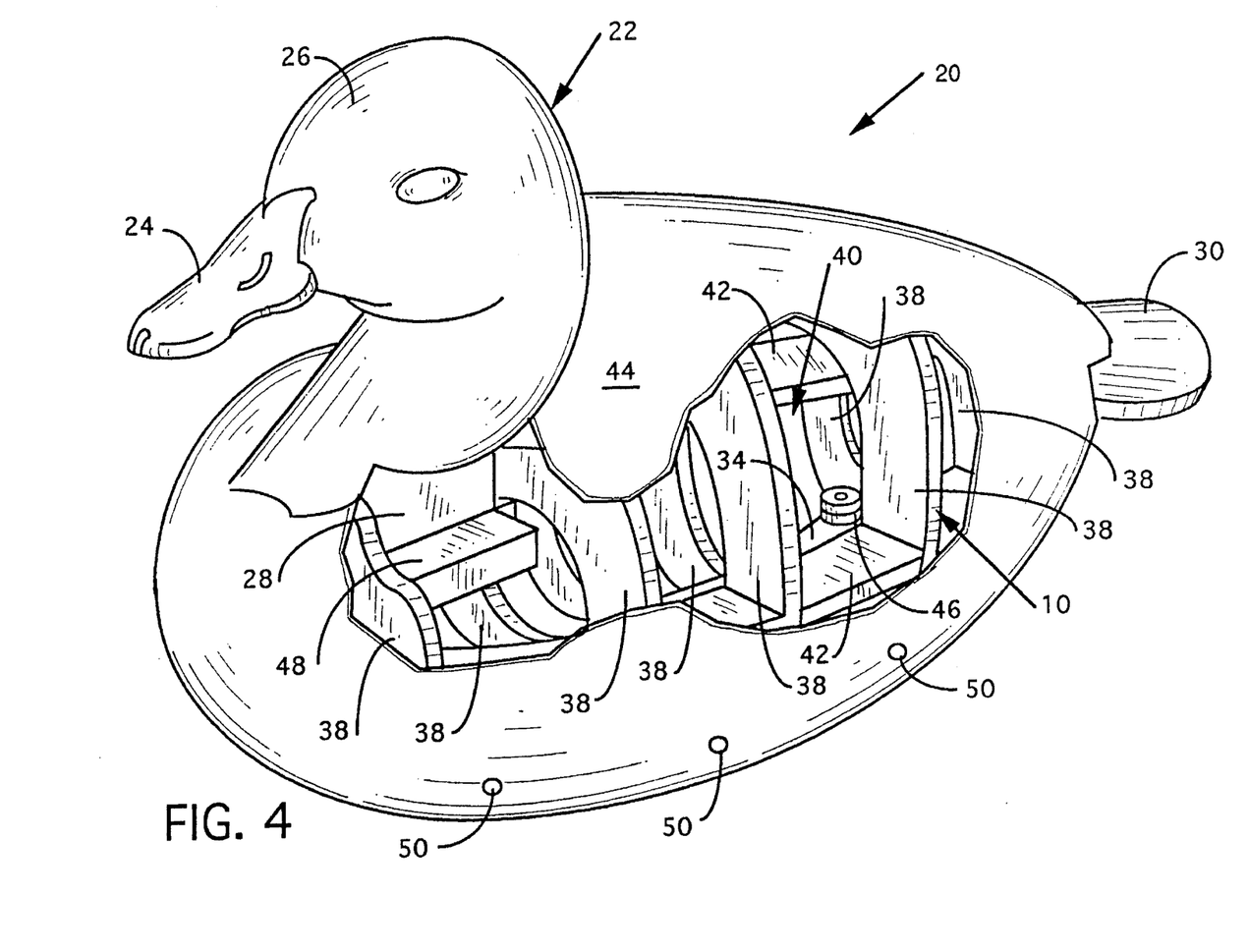
FIG. 4 is a perspective view, partially in section, of a wildlife, waterfowl decoy which incorporates the decoy form illustrated in FIG. 1.
Figure 5:
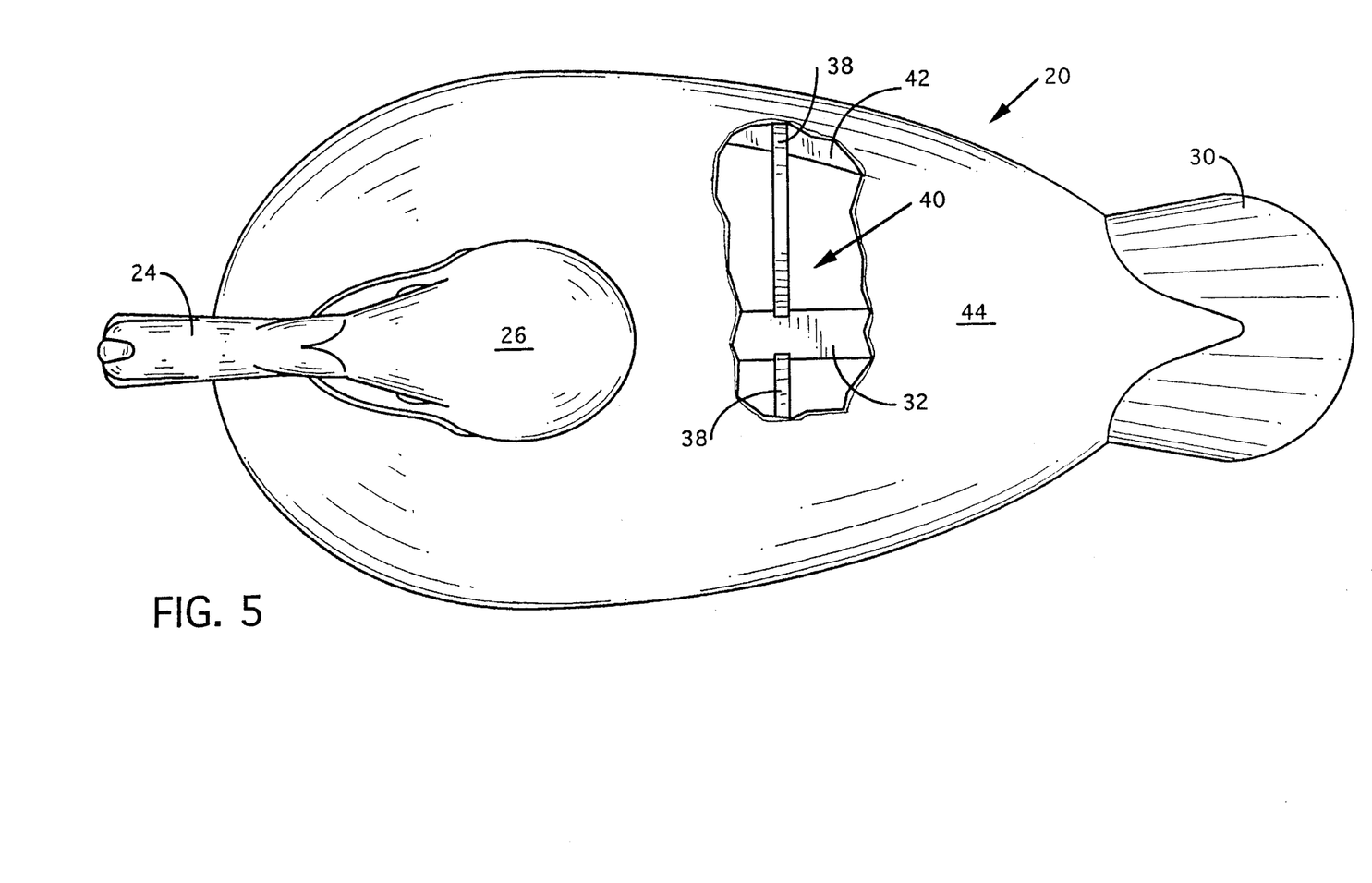
FIG. 5 is a top view, partially in section, of the decoy illustrated in FIG. 4.
Figure 6:
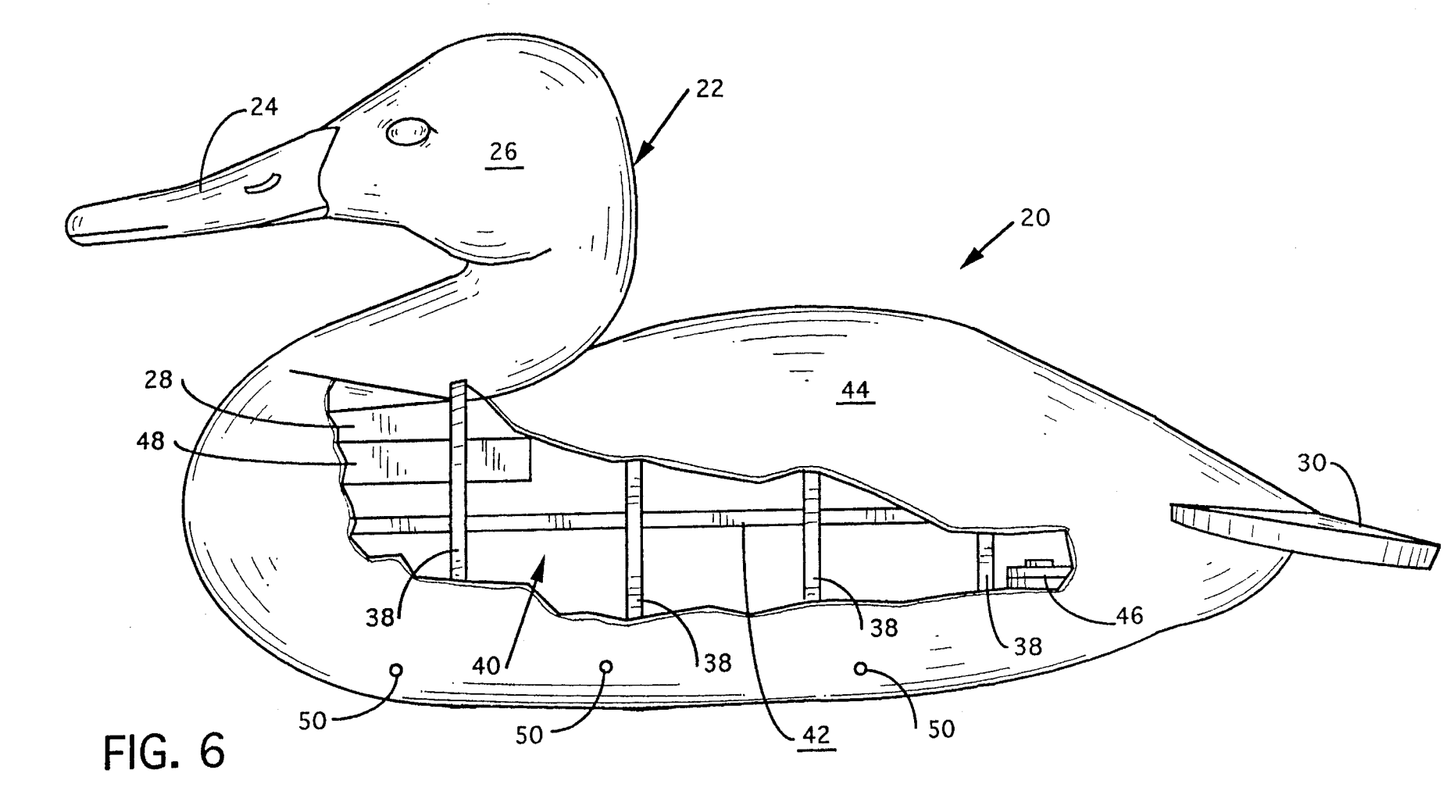
FIG. 6 is a side view, partially in section, of the decoy illustrated in FIG. 5.

As shown in FIGS. 4–6, a waterproof skin 44 is attached to the decoy form 10 with the skin 44 overlaying the ribs 38 and supports 32, 34 and 42. The waterproof skin 44 is preferably a canvas skin with the exterior painted to conform to the characteristics of the particular species.

As shown in FIGS. 5 and 6, a ballast weight 46 may be provided within the hollow interior 40 of the decoy 20 and attached to a support or rib to conform the decoy 20 to the floating characteristics of the subject species. The ballast weight 46 may be positioned off the center plane of the decoy 20 to counterbalance an offset head or the like. Additionally, the ballast weight 46 can be positioned above, below, fore or aft of the waterline to provide the appropriate floating characteristics. In addition to the ballast weight 46, buoyancy-assisting material, such as Styrofoam® block 48, can be positioned within the hollow interior 40 to help conform the decoy 20 to the floating characteristics of the subject species. The Styrofoam® block 48 can also be used to compartmentalize the hollow interior 40 of the decoy 20. Such compartmentalization will allow for a greater degree of design flexibility. Grommets 50 may be provided in the skin 44 to allow for selective flooding of portions of the hollow interior 40 of the decoy 20 to conform the floating characteristics of the decoy 20 to the subject species. The grommets 50 may be used with the compartmentalization of the hollow interior 40 of the decoy.

The decoy 20 of the present invention offers substantial advantages and benefits over a traditional canvas body decoy. These advantages include a more realistic representation of the appearance of the particular species, both above and below the waterline. Additionally, the decoy 20 provides an improved representation of flotation characteristics of the subject species. The decoy 20 provides better control over the flotation attitude as well as providing a greater range of available poses that can be depicted with the decoy 20. The decoy form 10 provides greater structural stability and durability to the decoy 20 of the present invention. These advantages combine to provide a more effective performance in the intended decoying of live birds with the decoy 20 of the present invention.

The following is a more detailed discussion of the construction of the decoy 20 with a wooden decoy form 10. As discussed above, the decoy form 10 may be formed of other suitable materials. The construction of a specific decoy 20 begins after the particular species to be depicted is determined. Each species of waterfowl has certain unique features, in addition to feather coloration, which will differentiate one species from another species. Some of these features include head profile, bill shape, tail shape, tail carriage, cross-sectional body proportions and waterline flotation characteristics. All of these characteristics must be taken into account for the various attitudes, i.e., sleeping, feeding, alert, aggressive, inquisitive, etc., that the bird may assume. An effective set of decoys should include decoys depicting several different attitudes to appear as a more natural grouping of birds.

After a review of the key characteristics of the subject species, the construction of the decoy begins with the basic side view and top view outlines or profiles of the decoy. These outlines should be drawn in alignment and to scale with the decoy. Regarding the construction of a series of decoys, it is generally best to begin with an outline pattern for a relaxed bird and then progress to make variations for the various attitudes accordingly.

After the outline profiles are constructed, the head section 22 and tail section 30 may be constructed. The construction of the head section 22 and tail section 30 will depend on the specific species and orientation of the bird to be patterned. The wooden head section 22 and tail section 30 would generally be carved from a solid block of wood with the broad outline of each typically being cut with a band saw and the remaining work performed using typical carving techniques. When carving the head section 22, an appropriate portion of the base 28 for fastening of the skin 44 must be maintained. The orientation of tail section 30 will determine whether or not a mortise joint can be used for the tail section 30. Mortise joints are an effective construction technique for interconnecting many elements of the decoy form 10.

With the top and side profile outlines, the supports 32, 34 and 42 can be constructed. Generally, ¾-inch wood is sufficiently thick for supports 32, 34 and 42, while ¼-inch wood is generally sufficient for the construction of ribs 38. The specific thicknesses may vary with the size of the decoy 20.

Figures 7A, 7B:
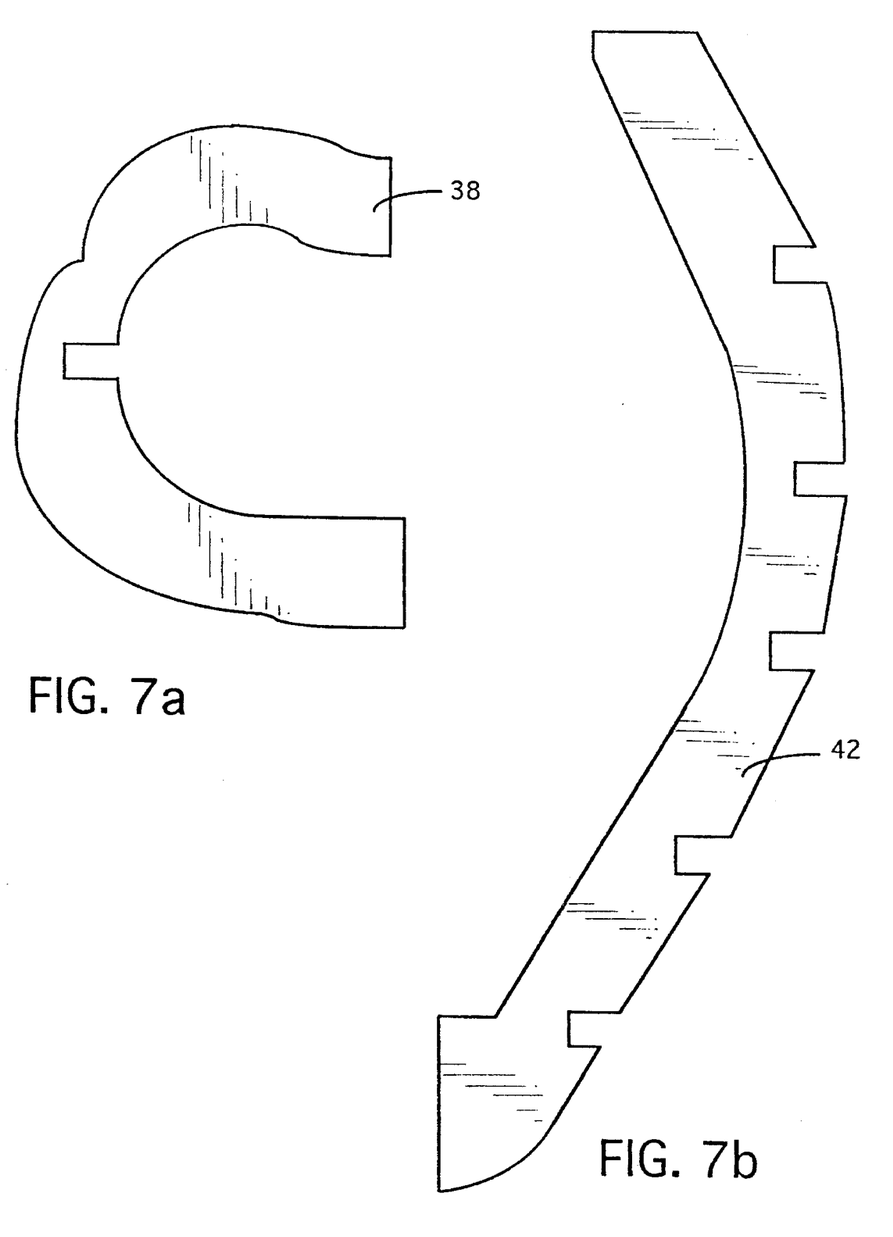
FIG. 7a is a front view of a rib for a right side of the decoy form illustrated in FIG. 1.
FIG. 7b is a top view of a side support for a left side of the decoy form illustrated in FIG. 1.

The upper and lower longitudinal supports 32 and 34 are contoured to follow the bird's outline with the upper longitudinal support 32 flaring at the base 28 to allow for a proper mortise connection at that point. The horizontal side supports 42 are contoured to follow the widest outline of the bird and to structurally interlock with all of the ribs 38. FIGS. 7a and 7b illustrate a disassembled rib 38 and side support 42 of the decoy form 10 illustrating an example of an appropriately designed mortise connection.

For larger species of birds, such as geese and loons, it may be necessary to add additional horizontal struts at roughly 45° above and below the side supports 42. Any additional horizontal supports should also interlock with the ribs 38 in a similar manner as side supports 42. The interlocking of all of the elements is important to provide the structural integrity needed for the decoy 20. As discussed above, the traditional method of construction of canvas body decoys does not allow a high degree of structural integration of elements.

In laying out the number and position of ribs 38, it is intended that one rib be positioned at both the front and back ends of the base 28 of the head section 22. One rib is located adjacent the tail section 30. Another rib is placed midway between the front and back ribs at the base 28. The spacing created among the three ribs at the base 28 establishes the spacing to be approached for the remaining ribs 38 positioned between the rib at the back of the base 28 and the rib at the tail section 30. Each rib 38 is constructed to contour the cross-sectional profile of the subject species at the specific location of the particular rib 38. This profile will consider the bulge of the side pocket feather group, the depression on the back between the shoulders, the bulge of the cape group of feathers and a transition of the shoulders and neck into the breast area. These features can be accurately depicted on the decoy form 10 by appropriate shaping of the ribs 38.

After all of the elements of the wooden decoy form 10 have been constructed, they can be assembled using conventional woodworking techniques. Before covering the decoy form 10 with the skin 44, the decoy form 10 should be suitably sealed since it will generally be subjected to repeated wet and dry conditions for many years.

A heavyweight canvas is generally used for the skin 44, although other suitable fabrics may be utilized. A piece of canvas is cut which is large enough to wrap around the entire decoy form 10. A hole is placed in the canvas for the head section 22 with the hole being of such a size that it closely fits around the base 28 of the head section 22. The canvas skin 44 will be glued and tacked to the base 28 and along the upper longitudinal support 32 and each rib 38. At the lower longitudinal support 34, the canvas can be trimmed, glued and overlapped and finally tacked into position at the bottom of the lower longitudinal support 34. After the canvas skin 44 is completely attached to the decoy form 10, the skin 44 is waterproofed with several coats of suitable sealer and may then be painted according to the particular species.

Aside from their use in hunting, decoys have traditionally been displayed for their aesthetic appearance. The decoy 20 of the present invention is also well suited for such display. Additionally, the decoy form 10 of the present invention presents a unique and innovative sculpture by itself. Consequently, with this in mind, it may be appropriate to form the decoy form 10 from selected hardwoods having an appealing grain finish, whereby the decoy form 10 can be attractively displayed without the skin 44 and, when needed, can be provided with the skin 44 to form the decoy 20 of the present invention.

It will be apparent to those of ordinary skill in the art that various modifications may be made to the present invention without departing from the spirit and scope thereof. Consequently, the scope of the present invention is intended to be defined by the attached claims.

What is claimed is:

1. A wildlife decoy form comprising:

a head section;

a tail section;

at least one longitudinal support coupled to said head section and said tail section extending along a longitudinal, peripheral portion of said decoy form around a single hollow interior; and a plurality of circumferential ribs attached to each said longitudinal support at spaced locations thereon, wherein each said circumferential rib extends along a peripheral portion of said decoy form around said single hollow interior, wherein said single hollow interior extends substantially the length of said decoy form between said head section and said tail section.

2. The decoy form of claim 1 wherein said plurality of circumferential ribs is substantially parallel to each other and wherein said decoy form includes two of said longitudinal supports.

3. The decoy form of claim 2 wherein said two longitudinal supports include an upper longitudinal support extending along an upper peripheral portion of said decoy form, and a lower longitudinal support extending along a lower peripheral portion of said decoy form.

4. The decoy form of claim 3 wherein each said circumferential rib extends from said upper longitudinal support to said lower longitudinal support.

5. The decoy form of claim 1 wherein each said rib is formed of wood.

6. The decoy form of claim 5 wherein each said longitudinal support is formed of wood.

7. The decoy form of claim 2 wherein said head section is a carved wooden head section.

8. The decoy form of claim 1 wherein said decoy is a waterfowl.

9. A wildlife decoy comprising:

a wildlife decoy form including a head section, a tail section, at least one longitudinal support coupled to said head section and said tail section extending along a longitudinal, peripheral portion of said decoy around a single hollow interior, and a plurality of substantially parallel, circumferential ribs attached to each said longitudinal support at spaced locations thereon, wherein each said circumferential rib extends along a peripheral portion of said decoy around a single hollow interior; and a skin attached to said decoy form and overlaying at least a portion of each said support and each said circumferential rib around said single hollow interior, wherein said single hollow interior extends substantially the length of said decoy form between said head section and said tail section.

10. The decoy of claim 9 wherein said skin is a waterproof canvas skin.

11. The wildlife decoy of claim 9 wherein said head section is a carved wooden head section.

12. The decoy of claim 9 further including a ballast weight provided within said hollow interior.

13. The decoy of claim 12 wherein said ballast weight is positioned off the longitudinal center plane of said decoy.

14. The decoy of claim 9 further including a buoyancy-assisting means positioned within said hollow interior.

15. The decoy of claim 9 further including at least one grommet positioned within said skin for selectively flooding said hollow interior.

16. The decoy of claim 9 wherein said decoy includes two of said longitudinal supports, including an upper longitudinal support extending along an upper peripheral portion of said decoy form, and a lower longitudinal support extending along a lower peripheral portion of said decoy form.

17. The decoy of claim 16 wherein each said circumferential rib extends from said upper longitudinal support to said lower longitudinal support.

18. A waterfowl buoyant decoy comprising:

a waterfowl decoy form including a head section, a tail section, an upper longitudinal support attached to said head section and said tail section extending along an upper longitudinal, peripheral portion of said decoy along a longitudinal centerline of said decoy around a single hollow interior, a lower longitudinal support coupled to said head section and said tail section extending along a lower longitudinal, peripheral portion of said decoy along said longitudinal center plane around said single hollow interior, a pair of side supports extending from a front of said decoy form to said tail section, said side supports extending along a peripheral portion of said decoy substantially along a plan profile of said decoy around said single hollow interior, and a plurality of wooden, substantially parallel circumferential ribs attached to and extending between said upper and lower longitudinal supports at spaced locations thereon, each said rib extending along a peripheral portion of said decoy around said single hollow interior, wherein said ribs and said upper and lower longitudinal supports and said side supports define said single, continuous hollow interior which extends substantially from said front of said decoy form to said tail section; and a waterproof skin attached to said form, said skin overlaying said ribs, said side supports and said longitudinal supports substantially surrounding said single hollow interior.

19. The waterfowl buoyant decoy of claim 18 wherein said head section is a carved wooden head section.

\* \* \* \* \*